United States Patent
Li et al.

(10) Patent No.: US 11,152,169 B1
(45) Date of Patent: Oct. 19, 2021

(54) MOUSE DEVICE

(71) Applicant: Primax Electronics Ltd., Taipei (TW)

(72) Inventors: Ya-Jun Li, Taipei (TW); Chun-Cheng Lu, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/136,188

(22) Filed: Dec. 29, 2020

(30) Foreign Application Priority Data

Nov. 3, 2020 (CN) .......................... 202011211953.4

(51) Int. Cl.
*H01H 13/14* (2006.01)
*H01H 13/86* (2006.01)
*H01H 13/85* (2006.01)
*G06F 3/0354* (2013.01)

(52) U.S. Cl.
CPC ......... *H01H 13/86* (2013.01); *G06F 3/03543* (2013.01); *H01H 13/85* (2013.01); *H01H 2221/058* (2013.01); *H01H 2227/016* (2013.01); *H01H 2227/024* (2013.01)

(58) Field of Classification Search
CPC ...... H01H 3/125; H01H 13/705; H01H 13/14; H01H 13/70; H01H 13/704; H01H 13/7065; H01H 13/7006; H01H 13/7057; H01H 13/78; H01H 13/79; H01H 13/52; H01H 13/703; H01H 13/507; H01H 13/06; H01H 2223/002; H01H 9/04; H01H 13/86; H01H 2009/048; H01H 13/063; H01H 23/06; H01H 9/041; H01H 19/06

See application file for complete search history.

(56) References Cited

U.S. PATENT DOCUMENTS

| | | | | |
|---|---|---|---|---|
| 5,367,133 | A * | 11/1994 | Schmidt ................. | H01H 13/14 200/302.1 |
| 10,877,589 | B2 * | 12/2020 | Lee ......................... | G06F 3/044 |
| 2009/0020402 | A1 * | 1/2009 | Ichikawa ............... | H01H 13/06 200/341 |
| 2012/0147570 | A1 * | 6/2012 | Yamazaki ............ | H01H 13/705 361/748 |
| 2018/0254720 | A1 * | 9/2018 | Ohishi .................... | H01H 13/06 |
| 2020/0266009 | A1 * | 8/2020 | Shimizu ............. | A61B 1/00066 |

* cited by examiner

*Primary Examiner* — Ahmed M Saeed
(74) *Attorney, Agent, or Firm* — Kirton McConkie; Evan R. Witt

(57) ABSTRACT

A mouse device includes a casing, a circuit board and two button modules. The circuit board is disposed within the casing. Each button module includes an electronic switch, a button lid, a first protrusion post, a second protrusion post and a buffering structure. The electronic switch is disposed within the casing. An end of the button lid is connected with the casing. The first protrusion post and the second protrusion post are disposed on the bottom surface of the button lid. The buffering structure is disposed on the casing and aligned with the second protrusion post. The second protrusion post is inserted into a buffering hole of the buffering structure. While the button lid is depressed or the pressing force is released, the buffering structure is contacted or not contacted with the second protrusion post along a first lateral direction and/or a second lateral direction.

10 Claims, 6 Drawing Sheets

MOUSE DEVICE

FIELD OF THE INVENTION

The present invention relates to a mouse device, and more particularly to a mouse device for allowing the user to stably depressing the buttons thereof.

BACKGROUND OF THE INVENTION

A mouse device (also referred as a pointer device or a cursor control device) is a basic hardware device for the user to operate a computer system or a notebook computer. By simply moving the mouse device, pressing the button or clicking a selected icon with the user's hand, a desired function can be quickly executed under the graphics-based operating system.

FIG. 1A is a schematic perspective view illustrating the appearance of a conventional mouse device. Conventionally, most mouse devices are designed according to an optical sensing technology. That is, the optical sensing technology is used to sense the movement of the mouse device. As shown in FIG. 1A, the mouse device is equipped with a scroll wheel 15 for allowing the user to browse web pages or document pages. Moreover, two buttons are arranged on the left side and the right side of the scroll wheel. The buttons may be depressed or clicked to execute the corresponding functions.

FIG. 1B is a schematic cutaway view illustrating the conventional mouse device as shown in FIG. 1A. As shown in FIG. 1B, the first button is defined by a sheet-like button lid 11 and an underlying electronic switch 13 collaboratively, and the second button is defined by a sheet-like button lid 12 and an underlying electronic switch 14 collaboratively. The button lids 11 and 12 are installed on a casing 10 of the mouse device 1 in a suspended manner. In response to a pressing force or an external force of the user, the button lids 11 and 12 can be swung downwardly. When a protrusion post 110 or 120 on the bottom surface of the button lid 11 or 12 is moved downwardly to push the underlying electronic switch 13 or 14, the underlying electronic switch 13 or 14 is triggered to generate a signal. When the button lids 11 and 12 are no longer depressed, the button lids 11 and 12 are swung upwardly.

However, since one end of the button lid 11 or 12 is connected with the casing 10, the other edges are suspended. If the pressing force is not uniformly distributed or the edge of the button lid 11 or 12 is depressed, some problems occur. For example, while the button lid 11 or 12 is swung upwardly or downwardly, the button lid 11 or 12 is possibly twisted or rocked toward the two lateral sides. Under this circumstance, the protrusion post 110 or 120 cannot be straightly moved downwardly to trigger the electronic switch 13 or 14. For solving this problem, additional positioning mechanisms are disposed under the button lids 11 and 12 to avoid the rocking condition. However, the positioning mechanism may be contacted with and rubbed against the surrounding part of the casing. Consequently, during the operation of the mouse device, a noise may be generated, or the material powder may drop down. Because of these problems, the electronic switches or associated components are damaged, and the tactile feel of depressing or clicking the buttons is impaired.

Therefore, there is a need of providing an improved mouse device in order to overcome the drawbacks of the conventional technology.

SUMMARY OF THE INVENTION

The present invention provides a mouse device. The mouse device includes a buffering structure. The buffering structure is made of the material with lubricity or wear resistance. Due to the buffering structure, the button of the mouse device can be depressed stably. Moreover, during the operation of the mouse device, the possibility of causing damage of associated components, generating the noise or dropping down the material powder is minimized. In addition, the tactile feel of depressing or clicking the button is enhanced.

In accordance with an aspect of the present invention, a mouse device is provided. The mouse device includes a casing, a circuit board and two button modules. The circuit board is disposed within the casing. Each button module includes an electronic switch, a button lid, a first protrusion post, a second protrusion post and a buffering structure. The electronic switch is disposed within the casing and electrically connected with the circuit board. An end of the button lid is connected with the casing. The first protrusion post is disposed on a bottom surface of the button lid. The second protrusion post is disposed on the bottom surface of the button lid. The buffering structure is disposed on the casing and aligned with the second protrusion post. The second protrusion post is inserted into a buffering hole of the buffering structure. When the button lid is in an undepressed state, a distance between the buffering structure and the second protrusion post along a first lateral direction or a second lateral direction is not larger than a predetermined length. While the button lid is switched from the undepressed state to a depressed state or the button lid is switched from the depressed state to the undepressed state, the buffering structure is contacted or not contacted with the second protrusion post along the first lateral direction and/or the second lateral direction.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

The present invention provides a mouse device. An example will be described as follows.

Figure 1A:
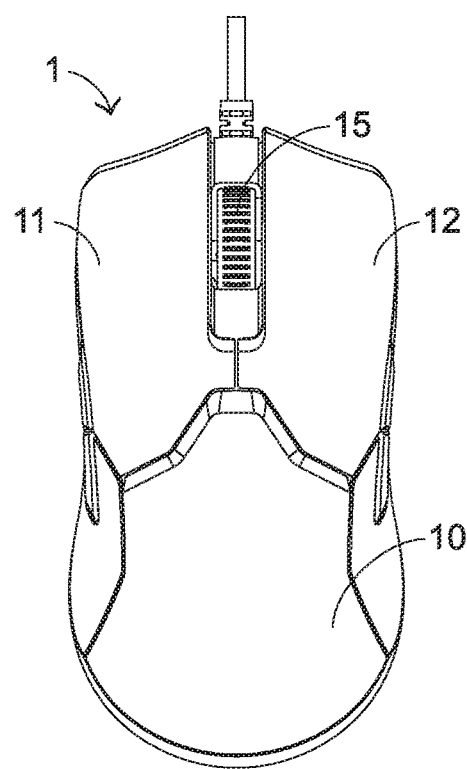
FIG. 1A is a schematic perspective view illustrating the appearance of a conventional mouse device.
Figure 1B:
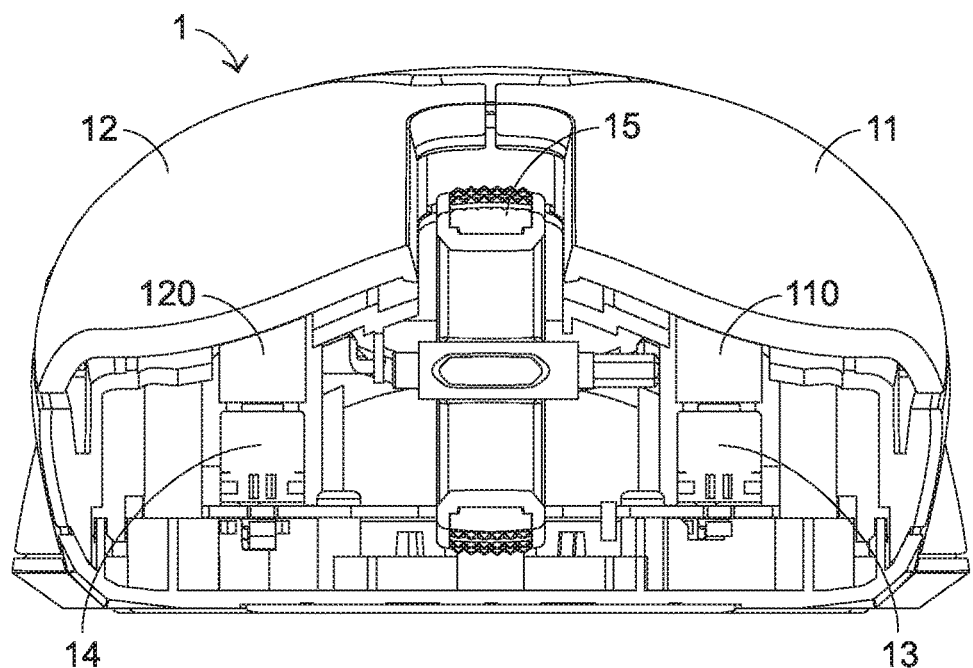
FIG. 1B is a schematic cutaway view illustrating the conventional mouse device as shown in FIG. 1A.
Figure 2A:
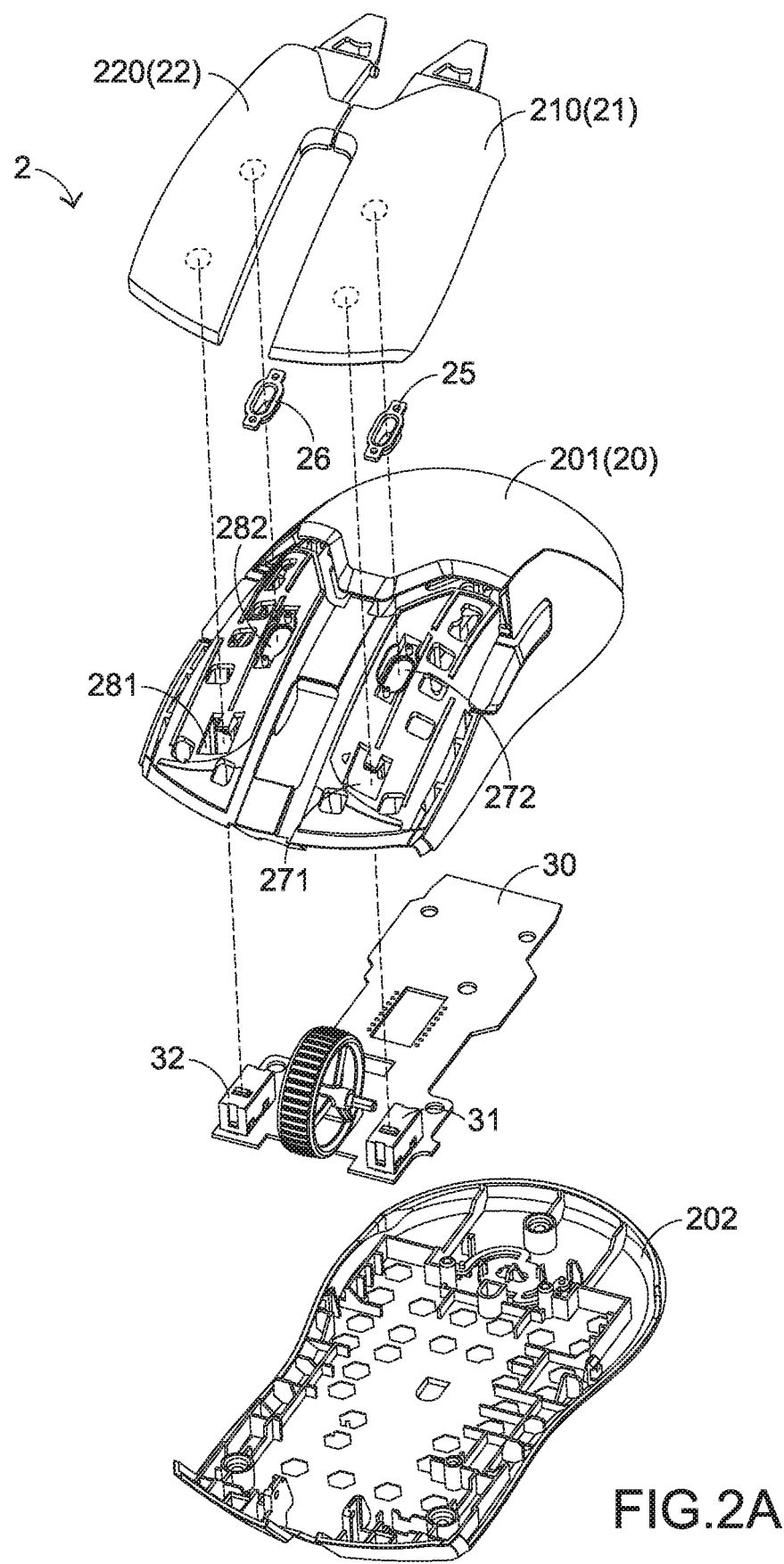
FIG. 2A is a schematic exploded view illustrating a mouse device according to an embodiment of the present invention and taken along a viewpoint.
Figure 2B:
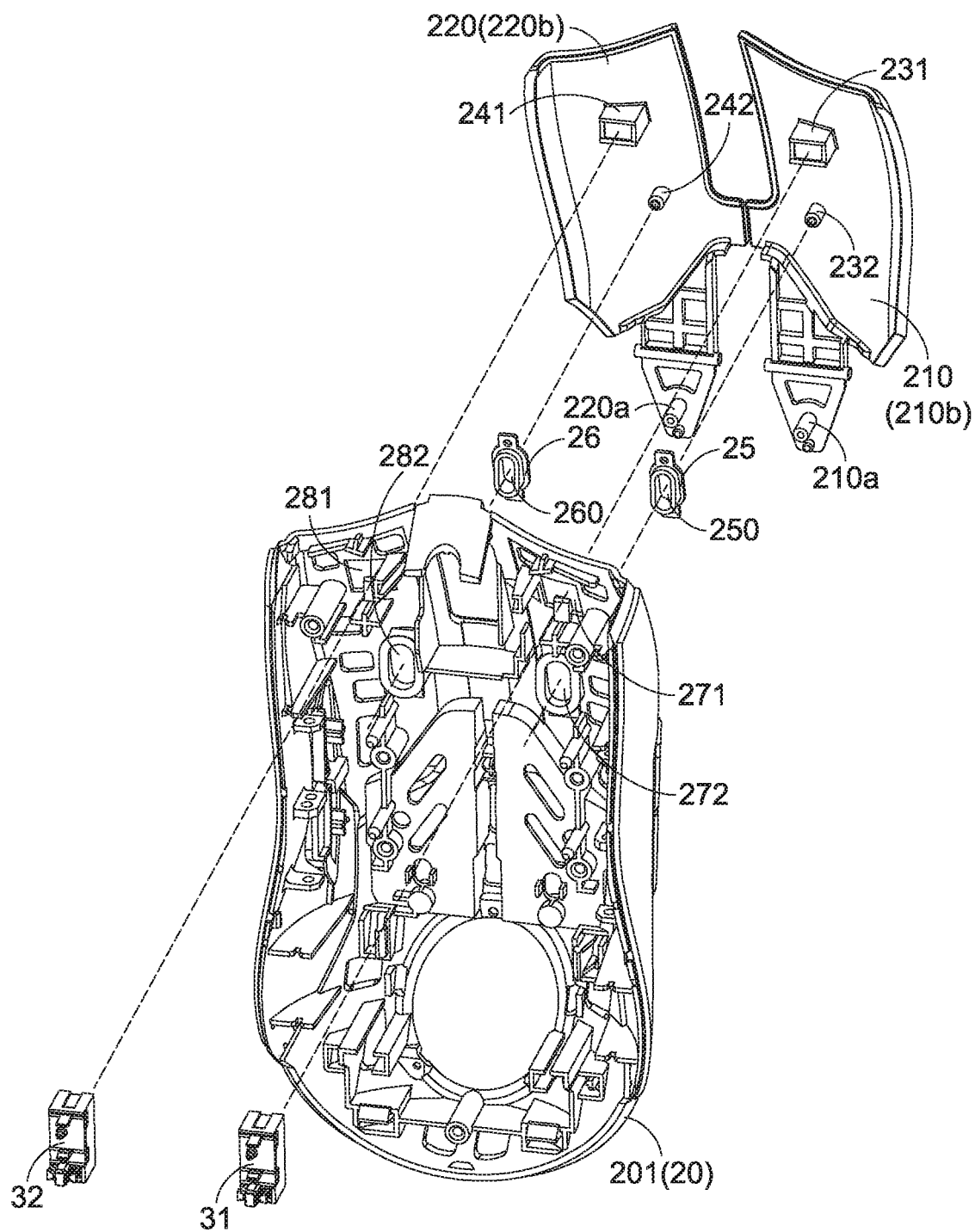
FIG. 2B is a schematic exploded view illustrating the mouse device according to the embodiment of the present invention and taken along another viewpoint.

Please refer to FIGS. 2A and 2B. FIG. 2A is a schematic exploded view illustrating a mouse device according to an embodiment of the present invention and taken along a viewpoint. FIG. 2B is a schematic exploded view illustrating the mouse device according to the embodiment of the present invention and taken along another viewpoint. The mouse device 2 of the present invention can allow the user to stably depress the button. However, the outer appearance of the mouse device 2 is similar to that of the conventional mouse device (e.g., the conventional mouse device 1 as shown in FIG. 1A). Due to the inner components and the inner structure design, the function of stably depressing the button can be achieved.

Please refer to FIGS. 2A and 2B again. The mouse device 2 mainly comprises a casing 20, a circuit board 30, a button module 21 and a button module 22. The circuit board 30 is disposed within the casing 20. In this embodiment, the casing 20 comprises an upper cover 201 and a lower cover 202. Each button module comprises an electronic switch, a button lid, a first protrusion post, a second protrusion post and a buffering structure. As shown in the drawings, the button module 21 comprises an electronic switch 31, a button lid 210, a first protrusion post 231, a second protrusion post 232 and a buffering structure 25, and the button module 22 comprises an electronic switch 32, a button lid 220, a first protrusion post 241, a second protrusion post 242 and a buffering structure 26.

The two electronic switches 31 and 32 are disposed within the casing 20 and electrically connected with the circuit board 30. The upper cover 201 of the casing 20 has two first perforations 271 and 281. In this embodiment, each electronic switch and the corresponding first protrusion post are aligned with one corresponding first perforation. That is, each first protrusion post is penetrated through the corresponding first perforation and aligned with the corresponding electronic switch. As shown in the drawings, the electronic switch 31 and the first protrusion post 231 are aligned with the first perforation 271, and the electronic switch 32 and the first protrusion post 241 are aligned with the first perforation 281. The first protrusion post 231 is penetrated through the first perforation 271 and aligned with the electronic switch 31. The first protrusion post 241 is penetrated through the first perforation 281 and aligned with the electronic switch 32.

The upper cover 201 of the casing 20 further has two second perforations 272 and 282. In this embodiment, each buffering structure is disposed within the corresponding second perforation and aligned with the corresponding second protrusion post. As shown in the drawings, the buffering structure 25 is disposed within the second perforation 272 and aligned with the second protrusion post 232, and the buffering structure 26 is disposed within the second perforation 282 and aligned with the second protrusion post 242. The buffering structure 25 has a buffering hole 250, and the second protrusion post 232 is inserted in the buffering hole 250. The buffering structure 26 has a buffering hole 260, and the second protrusion post 242 is inserted in the buffering hole 260. That is, the buffering structure 25 is arranged between the button lid 210 and the casing 20 (especially the upper cover 201), and the buffering structure 26 is arranged between the button lid 220 and the casing 20 (especially the upper cover 201).

Particularly, the first protrusion post 231 and the second protrusion post 232 are disposed on a bottom surface 210b of the button lid 210, and the first protrusion post 241 and the second protrusion post 242 are disposed on a bottom surface 220b of the button lid 220. The second protrusion post 232 is arranged behind the first protrusion post 231. The second protrusion post 242 is arranged behind the first protrusion post 241. An end 210a of the button lid 210 and an end 220a of the button lid 220 are coupled to the upper cover 201 of the casing 20. Consequently, when the button lid 210 or 220 is depressed by the user, the button lid 210 or 220 can be swung downwardly. As the button lid 210 or 220 is depressed, the first protrusion post 231 or 241 is moved downwardly to push the electronic switch 31 or 32. When the button lid 210 or 220 is no longer depressed by the user, the button lid 210 or 220 is swung upwardly. While the button lid 210 or 220 is swung upwardly or downwardly, the second protrusion post 232 or 242 is moved upwardly or downwardly within the buffering structure 25 or 26.

Figure 3A:
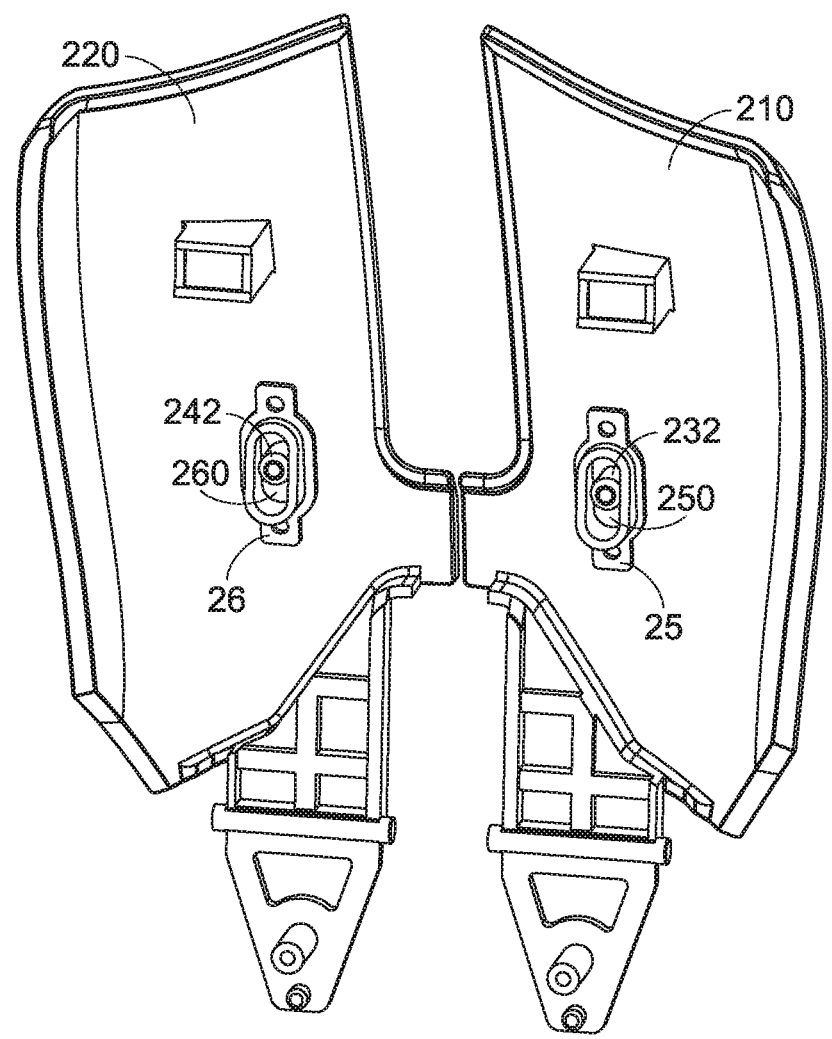
FIG. 3A is a schematic perspective view illustrating the relationships between the two button lids and the two buffering structures of the mouse device according to the embodiment of the present invention.
Figure 3B:
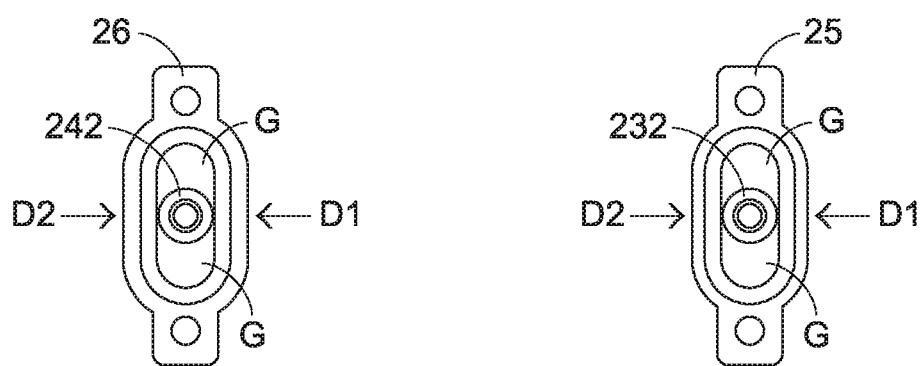
FIG. 3B is a schematic enlarged planar view illustrating some components of the mouse device as shown in FIG. 3A.
Figure 3C:
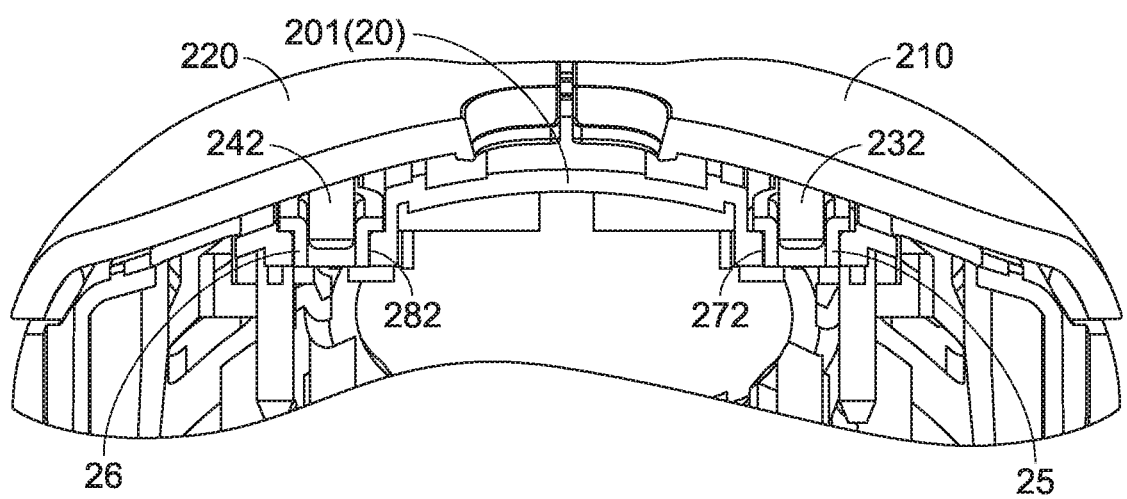
FIG. 3C is a schematic cutaway view illustrating some components of the assembled mouse device according to the embodiment of the present invention.

Please refer to FIGS. 3A, 3B and 3C. FIG. 3A is a schematic perspective view illustrating the relationships between the two button lids and the two buffering structures of the mouse device according to the embodiment of the present invention. FIG. 3B is a schematic enlarged planar view illustrating some components of the mouse device as shown in FIG. 3A. FIG. 3C is a schematic cutaway view illustrating some components of the assembled mouse device according to the embodiment of the present invention. After the mouse device 2 is assembled, the two second protrusion posts 232 and 242 are penetrated through the corresponding buffering structures 25 and 26, respectively. The two buffering structures 25 and 26 have ring-shapes profiles, especially the rounded rectangle structures. It is noted that the profiles of the buffering structures are not restricted. The buffering structures 25 and 26 are produced through an injection molding process or an extrusion molding process. The sizes and shapes of the buffering structures 25 and 26 match the sizes and the shapes of the second perforations 272 and 282. Consequently, the buffering structures 25 and 26 can be assembled with, installed in or locked in the corresponding second perforations 272 and 282.

In accordance with a feature of the present invention, the sizes of the associated components are specially designed. Consequently, the two second protrusion posts 232 and 242 can be smoothly penetrated through the corresponding buffering holes 250 and 260, respectively. When the button lids 210 and 220 are not depressed (i.e., in an undepressed state), the distance between the buffering structure 25 and the second protrusion post 232 and the distance between the buffering structure 26 and the second protrusion post 242 are not larger than a predetermined length along a first lateral direction D1 or a second lateral direction D2. For example, the predetermined length is 0.2 mm. In other words, after the mouse device 2 is assembled, the distances between the buffering structures 25, 26 and the corresponding second protrusion posts 232, 242 along the two lateral directions are very small.

While the button lids 210 and 220 are depressed or the button lids 210 and 220 are switched from the depressed state to the undepressed state (i.e., in an operating state), the buffering structures 25 and 26 can be contacted with the corresponding second protrusion posts 232 and 242 along the first lateral direction D1 and/or the second lateral direction D2. That is, the buffering structures 25 and 26 may be contacted with the left sides or the right sides of the corresponding second protrusion posts 232 and 242, or the buffering structures 25 and 26 may be contacted with the left sides and the right sides of the corresponding second protrusion posts 232 and 242 to clamp the corresponding second protrusion posts 232 and 242. Especially, even if the gap between the second protrusion post 232 or 242 and the buffering structure 25 or 26 is very small, the second protrusion post 232 or 242 generates a tiny lateral shift while the button lid 210 or 220 is in the operating state. Since the gap is very small, the second protrusion post 232 or 242 is limited or hindered by the buffering structure 25 or 26 immediately. In such way, the second protrusion post 232 and 242 will not be excessively deviated from the upper cover 201. Consequently, even if the pressing force is not uniformly distributed or the edge of the button lid 210 or 220 is depressed, the contact between the second protrusion post 232 or 242 and the buffering structure 25 or 26 can provide the stabilizing and positioning effect. In such way, the button lid 210 or 220 will not be twisted or rocked.

Moreover, if the pressing force is uniformly distributed, the second protrusion post 232 or 242 will not be contacted with the buffering structure 25 or 26 in the operating state. That is, a certain gap between the second protrusion post 232 or 242 and the buffering structure 25 or 26 is maintained. In some embodiments, the predetermined length is zero according to the more precise structural design. That is, there is no lateral distance between the second protrusion post 232 or 242 and the buffering structure 25 or 26. Consequently, in the undepressed state, the buffering structures 25 and 26 are contacted with the corresponding second protrusion posts 232 and 242. Consequently, the purpose of effectively avoiding and preventing the twisting or rocking condition of the button lids 210 and 220 in the entire course of the operating state can be achieved.

In an embodiment, the casing 20 and the button lids 210 and 220 are made of acrylonitrile butadiene styrene copolymer (ABS) resin, polycarbonate (PC) resin or the mixture of ABS resin and PC resin. In accordance with another feature of the present invention, the material of the buffering structures 25 and 26 is different from the material of the casing 20 and the button lids 210 and 220. Especially, the buffering structures 25 and 26 is made of the material with lubricity or wear resistance. For example, this material is ultra high molecular weight polyethylene (UPE), polytetrafluoroethylene (Teflon), polyoxymethylene (POM) or a mixture of Teflon and polyoxymethylene (POM). For example, the material with lubricity has a friction coefficient of less than 0.2, and the material with wear resistance has a Rockwell hardness value of 40 to 100. Consequently, even if the buffering structures 25 and 26 have been contacted with the corresponding second protrusion posts 232 and 242 for a long time, or even if the second protrusion posts 232 and 242 have been moved upwardly or downwardly within and reciprocally rubbed against the buffering structures 25 and 26 many times, the possibility of causing damage of associated components, generating the noise or dropping down the material powder will be minimized.

As mentioned above, the button lids 210 and 220 are swung downwardly or upwardly while the button lids 210 and 220 are depressed or the button lids 210 and 220 are switched from the depressed state to the undepressed state (i.e., in the operating state). Consequently, when the two second protrusion posts 232 and 242 are penetrated through the corresponding buffering structures 25 and 26 and contacted with the buffering structures 25 and 26 along the lateral directions in the operating state, it is necessary to retain free spaces between the second protrusion posts 232 and 242 and the corresponding buffering structures 25 and 26 in order to prevent from hindering the downward movement of the button lids 210 and 220. In this embodiment, when the second protrusion posts 232 and 242 are penetrated through the corresponding buffering structures 25 and 26, there is a gap G between the front edge of the second protrusion post 232 and a front end of the buffering structure 25, between the rear edge of the second protrusion post 232 and a rear end of the buffering structure 25, between the front edge of the second protrusion post 242 and a front end of the buffering structure 26 and between the rear edge of the second protrusion post 242 and a rear end of the buffering structure 26. For example, the gap G is not less than 0.5 mm. In other words, the gap G of the buffering holes 250 or 260 in the direction perpendicular to the first lateral direction D1 or the second lateral direction D2 is larger than the lateral distance between the buffering structure 25 or 26 and the second protrusion post 232 or 242.

It is noted that numerous modifications and alterations may be made while retaining the teachings of the invention. For example, as long as the associated components are contacted with each other to provide the stable button pressing function in the operation state, the shapes of the buffering structures may be modified.

Figure 4A:
FIG. 4A is a schematic enlarged planar view illustrating some components of a mouse device according to another embodiment of the present invention.
Figure 4B:
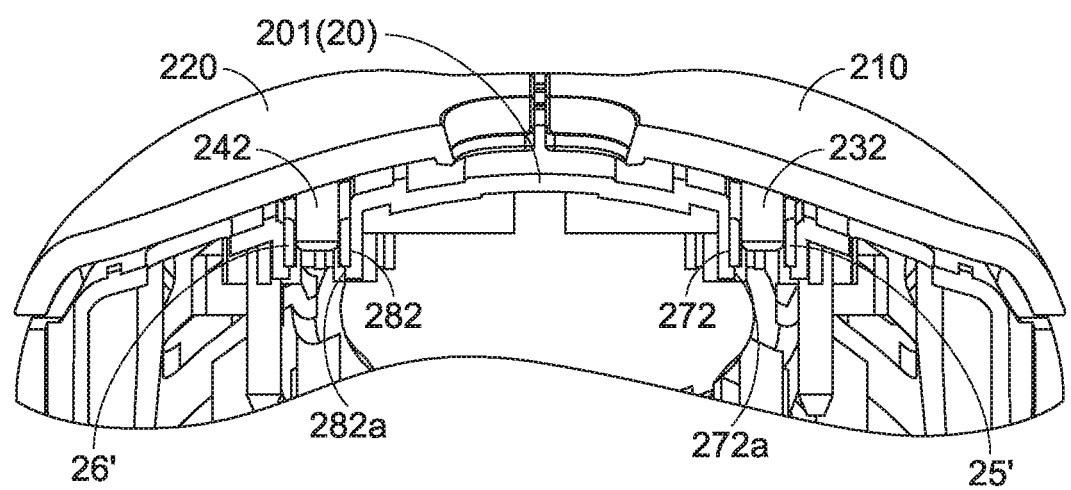
FIG. 4B is a schematic cutaway view illustrating some components of the assembled mouse device according to another embodiment of the present invention.

Please refer to FIGS. 4A and 4B. FIG. 4A is a schematic enlarged planar view illustrating some components of a mouse device according to another embodiment of the present invention. FIG. 4B is a schematic cutaway view illustrating some components of the assembled mouse device according to another embodiment of the present invention. As shown in FIG. 4A, each of the two buffering structures 25' and 26' is a two-sheet structure. That is, each buffering structure is composed of a left sheet part and a right sheet part. For example, the sheet-like buffering structures 25' and 26' have rectangular profiles and produced by using a die cutting process. Except for the buffering structures 25' and 26', the structures of the other components of this embodiment are substantially identical to those of the above embodiment.

Similarly, the sizes of the associated components are specially designed. While the button lids 210 and 220 are depressed or the button lids 210 and 220 are no longer depressed (i.e., an operating state), the buffering structures 25' and 26' can be contacted with the corresponding second protrusion posts 232 and 242 along the first lateral direction D1 and/or the second lateral direction D2. That is, the buffering structures 25' and 26' may be contacted with the left sides or the right sides of the corresponding second protrusion posts 232 and 242, or the buffering structures 25' and 26' may be contacted with the left sides and the right sides of the corresponding second protrusion posts 232 and 242 to clamp the corresponding second protrusion posts 232 and 242. Similarly, when the second protrusion posts 232 and 242 are penetrated through the corresponding buffering structures 25' and 26', there is a gap G between the front edge of the second protrusion post 232 and a front end of the buffering structure 25', between the rear edge of the second protrusion post 232 and a rear end of the buffering structure 25', between the front edge of the second protrusion post 242 and a front end of the buffering structure 26' and between the rear edge of the second protrusion post 242 and a rear end of the buffering structure 26'. In other words, there are vacant spaces beside the front end and the rear end of the buffering structure 25' and beside the front end and the rear end of the buffering structure 26'.

As mentioned above, each of the buffering structures 25' and 26' is composed of two separate sheet parts. In other words, the buffering structures 25' and 26' possibly drop off during the assembling or installing process. Please refer to FIG. 4B. For overcoming this problem, two protrusion edges 272a and 282a are formed on the bottom peripheries of the two second perforations 272 and 282. Preferably, the protrusion edges 272a and 282a are produced at the time when the two second perforations 272 and 282 are produced. Consequently, the buffering structures 25' and 26' can be placed in, loaded in or attached on the corresponding protrusion edges 272a and 282a. In comparison with the ring-shaped buffering structures of the above embodiment, the uses of the sheet-like buffering structures 25' and 26' of this embodiment can save the material cost.

From the above descriptions, the present invention provides a mouse device. Due to the structural design, the button of the mouse device can be depressed stably. Moreover, when the button is depressed, the purpose of effectively avoiding the twisting or rocking condition of the button can be achieved. Moreover, during the operation, the possibility of causing damage of associated components, generating the noise or dropping down the material powder is minimized. In other words, the mouse device of the present invention can effectively provide the stabilizing and positioning effect while the button is depressed. Consequently, the underlying electronic switch can be smoothly triggered. The electronic switch is not easily damaged. In addition, the tactile feel of depressing or clicking the button is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all modifications and similar structures.

What is claimed is:

1. A mouse device, comprising:
a casing;
a circuit board disposed within the casing; and
two button modules, wherein each button module comprises an electronic switch, a button lid, a first protrusion post, a second protrusion post and a buffering structure, wherein the electronic switch is disposed within the casing and electrically connected with the circuit board, an end of the button lid is connected with the casing, the first protrusion post is disposed on a bottom surface of the button lid, the second protrusion post is disposed on the bottom surface of the button lid, the buffering structure is disposed on the casing and aligned with the second protrusion post, and the second protrusion post is inserted into a buffering hole of the buffering structure, wherein when the button lid is in an undepressed state, a distance between the buffering structure and the second protrusion post along a first lateral direction or a second lateral direction is not larger than a predetermined length, wherein while the button lid is switched from the undepressed state to a depressed state or the button lid is switched from the depressed state to the undepressed state, the buffering structure is contacted with the second protrusion post along the first lateral direction and/or the second lateral direction when a pressing force is not uniformly distributed on the button lid, and the buffering structure is not contacted with the second protrusion post along the first lateral direction and/or the second lateral direction when the pressing force is uniformly distributed on the button lid.

2. The mouse device according to claim 1, wherein the casing comprises two first perforations, wherein the electronic switch and the first protrusion post of each button module are aligned with one of the two first perforations, and the first protrusion post of each button module is penetrated through the corresponding first perforation and aligned with the corresponding electronic switch.

3. The mouse device according to claim 1, wherein the casing comprises two second perforations, wherein the buffering structure of each button module is disposed within one of the two second perforations.

4. The mouse device according to claim 3, wherein the mouse device further comprises two protrusion edges, and the two protrusion edges are formed on bottom peripheries of the corresponding second perforations, respectively.

5. The mouse device according to claim 1, wherein the buffering structure of each button module has a ring-shaped profile, wherein when the second protrusion post is penetrated through the buffering structure, there is a gap between a front edge of the second protrusion post and a front end of the buffering structure, and there is another gap between a rear edge of the second protrusion post and a rear end of the buffering structure.

6. The mouse device according to claim 1, wherein the buffering structure of each button module comprises two sheet parts, wherein when the second protrusion post is penetrated through the buffering structure, there are vacant spaces beside a front end and a rear end of the buffering structure.

7. The mouse device according to claim 1, wherein in each button module, the second protrusion post is arranged behind the first protrusion post.

8. The mouse device according to claim 1, wherein the buffering structure of each button module is made of a material with lubricity or wear resistance.

9. The mouse device according to claim 1, wherein the buffering structure of each button module is made of ultra high molecular weight polyethylene (UPE), polytetrafluoroethylene (Teflon), polyoxymethylene (POM) or a mixture of Teflon and polyoxymethylene.

10. The mouse device according to claim 1, wherein the predetermined length is 0.2 mm.

* * * * *